Aug. 1, 1939.   R. E. KENNEDY ET AL   2,168,216
AIR PUMP FOR WINDSHIELDS
Filed Feb. 26, 1937   2 Sheets-Sheet 1

Inventors
R. E. Kennedy.
R. W. Bartle.
By Lacey & Lacey, Attorneys

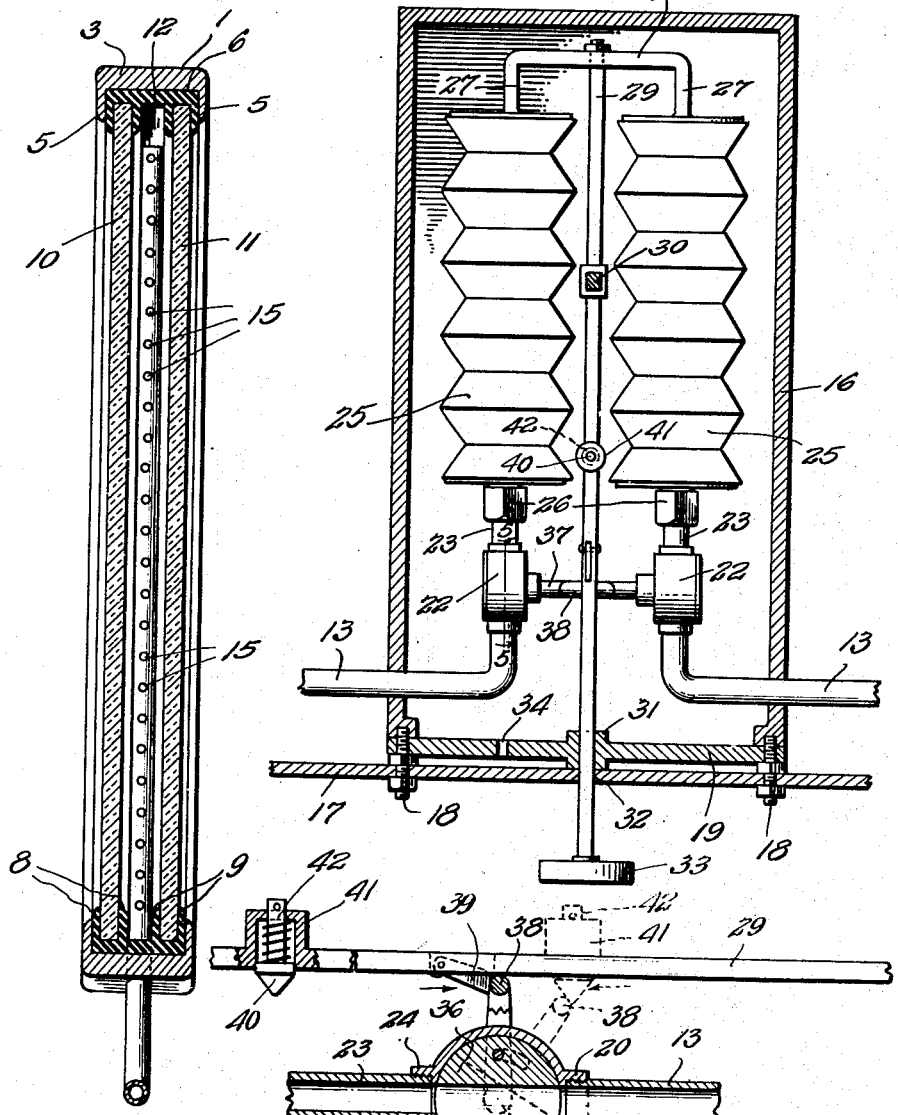

Patented Aug. 1, 1939

2,168,216

UNITED STATES PATENT OFFICE 2,168,216

AIR PUMP FOR WINDSHIELDS

Raymond E. Kennedy and Roy W. Bartle, New Albany, Ind.

Application February 26, 1937, Serial No. 127,992

2 Claims. (Cl. 230—160)

This invention relates to a windshield of the type used upon automobiles, and one object of the invention is to provide improved means for creating and maintaining a vacuum between panes of glass mounted in the frame of the windshield.

Another object of the invention is to provide improved means for creating and maintaining a vacuum between the panes of glass including perforated pipes extending into the space between the glass panes and means for exerting suction through the pipes to exhaust air from the space and form a partial vacuum therein.

Another object of the invention is the provision of improved suction-creating means wherein a pair of perforated pipes are connected with companion bellows by valves and operating means has been provided for not only simultaneously actuating the bellows but also to open and close the valves according to the direction in which the operating means and the bellows are moved.

Another object of the invention is to so construct the suction-creating means that the bellows will be enclosed in a housing carried by the dashboard of an automobile and the operating means for the bellows and the valves consist of a rod extending through the dashboard to a position where it may be readily grasped by the driver of the automobile.

Figure 1:
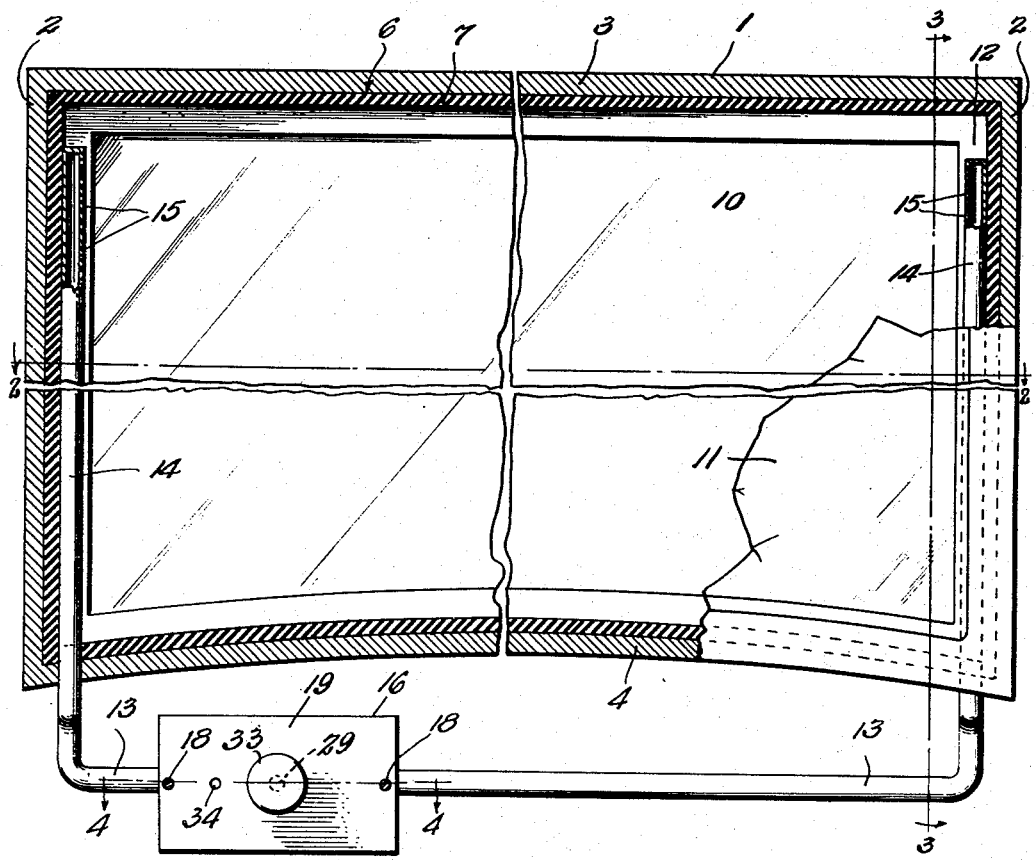
Figure 2:
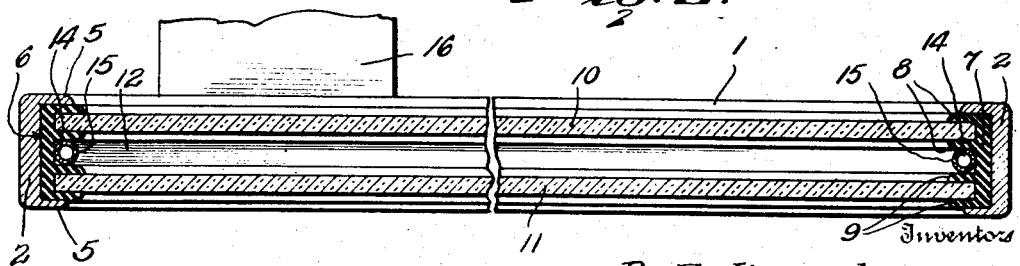

The invention is illustrated in the accompanying drawings, wherein:

Figure 1 is a view showing the improved vacuum-creating and maintaining means mounted in operative relation to a windshield having spaced inner and outer panes of glass, the view being partially in elevation and partially in vertical section, Figure 2 is a sectional view taken horizontally along the line 2—2 of Figure 1, Figure 3 is a vertical sectional view taken along the line 3—3 of Figure 1, Figure 4 is a sectional view upon an enlarged scale taken along the line 4—4 of Figure 1, and Figure 5 is an enlarged sectional view of one of the valves, the view being taken along the line 5—5 of Figure 4.

The windshield, which is indicated in general by the numeral 1, is of the proper length and height to accommodate itself to the automobile upon which it is to be applied and has its end bars 2 and upper and lower bars 3 and 4 channeled from their inner faces to provide flanges 5 defining a recess 6 in which is fitted an auxiliary packing frame 7 formed of rubber or equivalent elastic material. This packing frame is formed with circumferentially extending flanges 8 and 9 so that, when an outer glass pane 10 and an inner glass pane 11 are set into the packing frame with the flanges 8 and 9 in close contacting engagement with marginal portions of the panes of glass, a sealed joint will be formed about margins of each pane of glass and a space or pocket 12 provided between confronting faces of the two panes of glass which is air-tight.

In order that air may be sucked out of the space or pocket 12, there have been provided pipes 13 which extend longitudinally of the windshield under the same and are bent to provide vertically disposed portions 14. These vertically extending portions 14 of the pipes 13 extend upwardly through the lower bar 4 of the frame 1 and into opposite ends of the space or pocket 12 where they fit snugly between the inner ones of the flanges 8 and 9, as shown in Figure 2, and are thus very firmly held in place. In view of the fact that the vertically extending portions of the pipes extend through the packing frame a tight joint will be formed about them and air will be prevented from leaking about the pipes. Perforations 15 are formed in the vertically extending portions of the pipes and, therefore, when suction is exerted through these pipes air may be drawn out of the space or pocket 12 and a partial vacuum formed therein which will prevent frost from forming upon the windshield glass and preventing the driver of the automobile from seeing clearly.

The pipes 13 extend toward each other and enter a housing or casing 16 which is disposed horizontally in front of the dashboard 17 where it is mounted by bolts 18 which also serve to removably secure the head 19 of the casing in place, as shown in Figure 4. The end portions of the pipes within the casing are bent forwardly and each has threaded engagement with the neck 20 of the casing 21 of a valve 22. A nipple 23 is screwed into the neck 24 at the opposite side of the valve casing from the neck 20 and each nipple is connected with a bellows 25 by a union 26 which provides a good mounting for the rear ends of the bellows as well as establishing communication between the bellows and the pipes 13. The forward ends of the two bellows are connected with the arm 27 of a yoke 28 and this yoke is secured midway its arms with the forward end of an actuating rod 29 which is slidably engaged through a bearing bracket 30 suspended from the top wall of the casing or mounted in the casing in any other desired manner. The actuating rod is of sufficient length to pass through a bearing 31 formed in the head 19 and an opening 32 formed in the dashboard 17 and has the knob 33 at its rear end spaced rearwardly from the dashboard 17 at all times so that it may be readily grasped and motion imparted to the rod longitudinally thereof. A small opening or port 34 permits air to enter or pass out of the casing during operation of the device.

The two valves are to be simultaneously opened or closed during longitudinal movement of the rod and resulting operation of the bellows. Referring to Figure 5, it will be seen that in each valve there has been mounted a circular disk 35 carrying a side extension or shoulder 36 which, when turned from the position shown in Figure 5, serves as a barrier to close the confronting end of the pipe 13 and thus cut-off communication between a pipe 13 and its companion bellows. The disks 35 of the two valves are connected by a crank shaft 37 which serves as a valve stem common to both valves and the crank portion 38 of the first crank shaft extends upwardly for engagement by the pivoted tooth 39 and the yieldable abutment pin 40 carried by the actuating rod 29. The tooth 39 is pivotally mounted in a slot formed in the rod and the pin 40 is slidably supported in an offset portion 41 of the rod and yieldably held depressed by a spring 42. From an inspection of Figure 5, it will be readily understood that, when the rod is drawn rearwardly by pull exerted upon the knob 33, the crank shaft will be engaged by the tooth 39 and rocked to swing the barriers or closures 36 into closing relation to the pipes 13 and the opening 43 will be moved into registry with the opening 44 so that air may be forced from the collapsing bellows. Upon forward movement of the rod, the bellows which have been compressed during rearward movement thereof will be expanded and the pin which has been moved to the position indicated by dotted lines during rearward movement of the rod will engage the bridge of the crank and turn the crank shaft in a direction to return the barriers to the position shown in full lines and open the valve. The two bellows may thus be simultaneously compressed to force air through registering side openings 43 and 44 which have been brought into registry with each other by turning of the disks 35 and upon return movement of the actuating rod air will be sucked out of the chamber 12 between the glass panes 10 and 11 to create a partial vacuum therein. As the tooth 39 extends at an incilne, it may ride over the crank during forward movement of the rod.

When this windshield is in use, it is secured at the front of the automobile in the usual position and the pipes 13 extend to the casing which is secured against the front face of the dashboard or this casing may be secured against the front face of the instrument board if so desired. The packing strip or frame 7 forms a tight seal or joint about margins of the two panes of glass 10 and 11 and forms an air-tight packing for the space 12 between the two panes of glass. The rod 29 projects forwardly from the dashboard and by grasping the knob 33, this rod may be drawn rearwardly and then pushed forwardly. During rearward movement of the rod, the two bellows will be collapsed and the shaft 37 rocked to move the valve to a closed position. As the rod is thrust forwardly, the bellows will be expanded to suck air out of the space 12 through the vertically disposed perforated portions 14 of the two pipes and thus form a partial vacuum in the space between the panes of glass. This operation can be repeated until a sufficient vacuum has been formed. The vacuum in the space 12 will serve to prevent frost from forming upon the windshield in case a slow leak should occur and air seeps into the space 12 it is merely necessary for the operator of the automobile to reciprocate the rod and the partial vacuum will be restored.

Having thus described the invention, what is claimed as new is:

1. In a device of the character described, a pair of bellows spaced transversely from each other, valves for connecting ends of said bellows with companion pipes, each valve including a rotatable closure member movable into and out of position to block passage of air between a bellows and its companion pipe, a crank shaft extending between the valves and constituting interconnected stems for the closures of the valves, and operating means consisting of a rod mounted for reciprocating movement longitudinally of the bellows between the same, a yoke mounted upon said rod and projecting from opposite sides thereof with its ends connected to the bellows at opposite ends thereof from the valves, and means carried by the rod for rocking the crank shaft during reciprocation of the rod to open and close the valves during operation of the bellows.

2. In a device of the character described, a pair of vertically disposed bellows spaced transversely from each other, valves for connecting lower ends of the bellows with companion pipes, said valves having interconnected stems forming a crank shaft between the valves, an actuating rod slidable longitudinally of the bellows and located between the same, a yoke carried by the upper end of said rod and extending from opposite sides thereof over the bellows with its ends bent downwardly and secured to upper ends of the bellows, said rod having an offset portion defining a seat, a pin mounted in the offset portion and yieldably held in position for engaging the crank and turning the crank shaft to open the valves during upward longitudinal movement of the rod, and a tooth pivoted to the rod below the offset portion and extending longitudinally thereof in position for engaging the crank and turning the crank shaft to close the valves during downward longitudinal movement of the rod.

RAYMOND E. KENNEDY.
ROY W. BARTLE.